United States Patent [19]

Tsuno

[11] Patent Number: 4,901,904
[45] Date of Patent: Feb. 20, 1990

[54] METHOD OF PRODUCING BRAZING METALS

[75] Inventor: Nobuo Tsuno, Kasugai, Japan

[73] Assignee: NGK Insulators, Ltd., Nagoya, Japan

[21] Appl. No.: 183,309

[22] Filed: Apr. 12, 1988

Related U.S. Application Data

[63] Continuation of Ser. No. 886,367, Jul. 17, 1986, abandoned.

[30] Foreign Application Priority Data

Jul. 22, 1985 [JP] Japan .................... 60-160329

[51] Int. Cl.$^4$ .................. B23K 35/22; B23K 35/40
[52] U.S. Cl. .................. 228/56.3; 228/121; 228/122
[58] Field of Search .......... 228/198, 122, 56.3, 228/124, 121; 164/46

[56] References Cited

U.S. PATENT DOCUMENTS

| | | | |
|---|---|---|---|
| 3,692,087 | 9/1972 | Eberts | 164/46 |
| 3,915,369 | 10/1975 | Schmidt-Bruecken et al. | 228/198 |
| 3,921,701 | 11/1975 | Cordone | 164/46 |
| 3,986,255 | 10/1976 | Mandal | 228/226 |
| 4,180,700 | 12/1979 | Kraska et al. | 228/122 |
| 4,471,026 | 9/1984 | Nicholas et al. | 228/122 |
| 4,562,121 | 12/1985 | Thiemann et al. | 228/56.3 |
| 4,582,111 | 4/1986 | Kuehn et al. | 164/46 |

FOREIGN PATENT DOCUMENTS

| | | | |
|---|---|---|---|
| 5312 | 11/1979 | European Pat. Off. | 228/122 |
| 0038584 | 10/1981 | European Pat. Off. | |
| 2116310 | 10/1972 | Fed. Rep. of Germany. | |
| 3422329 | 1/1985 | Fed. Rep. of Germany. | |
| 141468 | 8/1984 | Japan | 228/122 |
| 33269 | 2/1985 | Japan | 228/122 |
| 166275 | 8/1985 | Japan | 228/122 |
| 215584 | 10/1985 | Japan | 228/122 |
| 231474 | 11/1985 | Japan | 228/122 |
| 1111979 | 5/1986 | Japan | 228/122 |
| 378765 | 7/1964 | Switzerland. | |
| 755771 | 8/1980 | U.S.S.R. | 228/122 |
| 735929 | 8/1955 | United Kingdom | 228/122 |
| 813829 | 5/1959 | United Kingdom | 228/122 |
| 1094052 | 12/1967 | United Kingdom. | |

OTHER PUBLICATIONS

Metals Handbook Ninth Edition, vol. 5, pp. 303–309, "Electropolishing", copyright 1982.

Primary Examiner—Richard K. Seidel
Assistant Examiner—Samuel M. Heinrich
Attorney, Agent, or Firm—Arnold, White & Durkee

[57] ABSTRACT

Active brazing metals that can joint ceramic members mutually or a ceramic member and a metallic member to each other with high joint strength and improved availability can be provided in various shapes such as plate or wire, even when a metal of poor ductility is used as a raw material of the brazing metals.

12 Claims, 1 Drawing Sheet

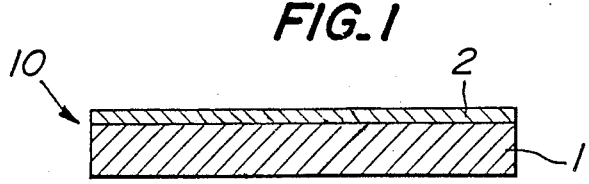
FIG._1
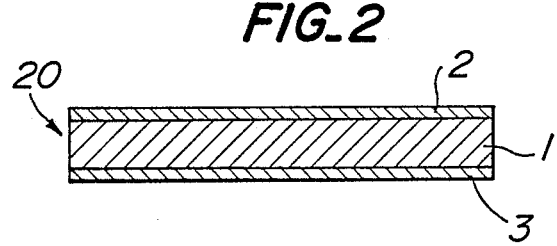
FIG._2
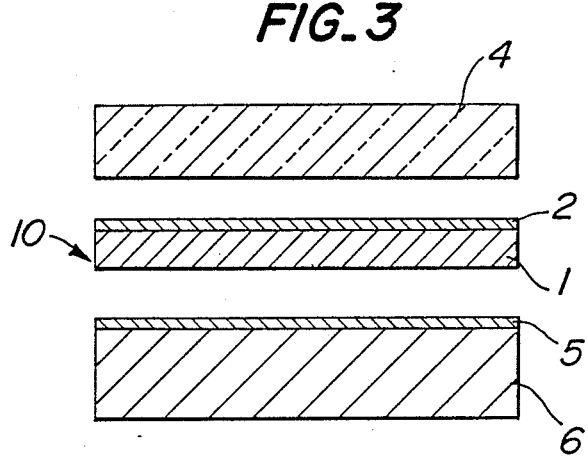
FIG._3
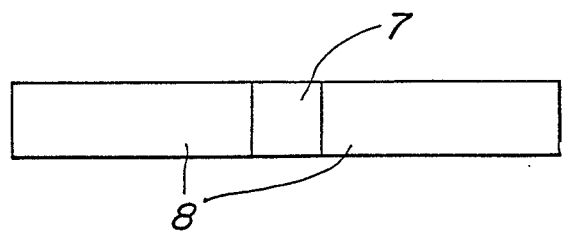
FIG._4

METHOD OF PRODUCING BRAZING METALS

This is a continuation of application Ser. No. 886,367 filed Jul. 17, 1986, now abandoned.

BACKGROUND OF THE INVENTION

1. Field of the Invention

The present invention relates to a method of producing brazing metals, particularly for jointing ceramic members mutually or a metallic member and a ceramic member to each other.

2. Related Art Statement

Heretofore, a jointing method using an active brazing metal has been known in a method of jointing ceramic members mutually or a metallic member and a ceramic member to each other. In this jointing method, superimposed foils of alloys containing an active metal such as Ti or Zr, or a foil of such active metal superimposed on a foil of metal such as Ni, are sandwiched between surfaces of ceramic members or surfaces of a metallic member and a ceramic member to be jointed, and heated to effect jointing of the members. For example, U.S. Pat. No. 2,857,663 and Japanese patent application publication No. 12,575/61 disclosed a brazing method wherein a foil of a Ti group metal and a foil of Cu or Ni are sandwiched and heated between surfaces of a metallic member and a ceramic member or surfaces of two ceramic members to be jointed. However, this method has the following drawbacks:

(1) The active metals that can be used as brazing metals are limited to those metals that can be easily wrought to foils, so that metals of poor ductility can not be used.

(2) The foils are liable to oxidize at their surfaces, so that an alloy can not be completely formed between the active metal foil consisting of the brazing metal and other foil.

(3) A plurality of foils are superimposed, so that, jointing of members of complicated jointing surfaces can not easily be obtained.

(4) Thicknesses of the foils are varied for varying the composition of the brazing metals, so that an alloy of low alloy content can not be produced. Therefore, the brazing metals become brittle, and the joint is weak in strength.

U.S. Pat. No. 4,471,026 disclosed ternary alloy solders consisting of Cu, Ti and a metal selected from Ag, Au, Sn or In for brazing ceramic members mutually, which also disclosed methods of producing the solders by preliminarily melting three metals to form an alloy thereof, knitting three metals wires to form a strand, superimposing three metal sheets, or mixing three metals powders. However, these methods also have the following drawbacks:

(1) In the method of preliminarily melting three metals to form an alloy, Ti content in the alloy is high, so that only a fragile alloy can be obtained, which is difficult to work in to a sheet-like ductile brazing metal.

(2) In the methods of using wires, sheets or powders of the metals as raw materials, costs of processing these raw materials are so expensive that practical use of the methods is not economical.

U.S. Pat. No. 4,486,386 specification disclosed Pd-Au alloy solder containing at least one of Ti, V and Zr. However, it has disadvantages that special melting such as vacuum melting or the like is necessary for melting active metals such as Ti, V and Zr, and that the obtained alloys are difficult to work.

Japanese patent application laid-open No. 81,071/85 disclosed a metal sheet for jointing ceramic members, wherein a layer of brazing metals is coated with a layer of an active metal. However, this sheet has a shortcoming that the thickness of the active metal layer is too large as compared to the thickness of the brazing metals layer, so that a joint of satisfactory strength can not be obtained.

SUMMARY OF THE INVENTION

It is an object of the present invention to provide a method of producing active brazing metals for jointing ceramic members mutually or a ceramic member and a metallic member to each other, which is easy to produce and handle and exhibits high joint strength.

Another object of the present invention is to provide a method of producing active brazing metals for jointing ceramic members mutually or a ceramic member and a metallic member to each other, wherein the content of active metal is easily adjusted.

A further object of the present invention is to provide a method of producing active brazing metals in which metals of poor ductility can be used as the active metals.

The present invention is a method of producing brazing metals which is composed of a metal substrate and at least one metal layer applied on at least one surface of the metal substrate for jointing ceramic members mutually or a ceramic member and a metallic member to each other. The surface of the substrate comprises a planar or strand shape and is produced by at least one method selected from the group consisting of rolling, drawing and liquid quenching. The surface is scheduled for applying a metal layer thereon and is adjusted to a surface roughness of center line average height Ra of 0.1–2.0 $\mu$m. Thereafter, at least one metal element which, as compared with standard free energy of formation in reaction between the metal element and a non-metal element which mainly constitute the ceramic member, has less standard free energy of formation of reaction with the non metal element and a higher m.p. than that of the metal substrate, is applied on the scheduled surface of the metal substrate such that a thickness ratio or a thickness to diameter ratio to that of the metal substrate becomes $5 \times 10^{-3} - 1 \times 10^{-1}$. The metal element is applied by a method selected from the group consisting of physical vapor deposition (PVD) process, chemical vapor deposition (CVD) process and metal plating process.

The metal elements constituting the metal layer is selected from metal elements satisfying the above mentioned condition, depending on the kinds of the ceramic members to be jointed by the brazing metals. For instance, if the ceramic members are nitride ceramics or sialon products, the metal element is preferably at least one metal element selected from the group consisting of Zr, Ti, B, Ta, Hf, La, Sc and Y, and if the nitride ceramics is silicon nitride, the metal element is preferably at least one metal element selected from the above group, and most preferably at least one of Zr, Ti and Ta. If the ceramic members are carbide ceramics, the metal element is preferably at least one metal element selected from the group consisting of Zr, Ti, Ta, V, Cr and Mo, and if the carbide ceramics is silicon carbide, the metal element is preferably at least one metal element selected from the above group, and most preferably at least one of Zr, Ti, Ta and Cr. If the ceramic members are oxide ceramics, the metal element is preferably at least one metal element selected from the group consisting of Be, Ge, Zr and Ti, and if the oxide ceramics is at least one ceramics selected from the group consisting of zirconia, alumina, mullite, aluminum titanate and cordierite, the metal element is most preferably at least one metal element selected from the group consisting of Be, Ce, Zr and Ti.

These metal elements are all selected from metal elements which, as compared with standard free energy of formation in reaction between the metal element and the non-metal element (which mainly constitute the ceramic member to be jointed by the brazing metals produced by the method of the present invention), have less standard free energy of formation in reaction with the non-metal element.

The metal elements in the metal layer have a property to decompose the ceramics into metal elements and non-metal elements, and react with the non-metal elements to form compounds thereof. The reaction between the metal element and the ceramic member more easily proceeds when the metal element is in a liquid state. Therefore, when jointing the metallic member and the ceramic member by means of the brazing metals produced by the method of the present invention, the metal element consistuting the metal layer of the brazing metals is dissolved in a melt of the metal substrate so as to react with the ceramic member.

Alloys containing the metal element in the metal substrate in situ are not preferable, because they are poor in ductility, and difficult to produce and control the amount of the metal element to be added or applied.

If the metal elements in the metal layer have larger standard free energy of formation in reaction with nonmetal element (mainly constituting the ceramic member), than standard free energy of formation in reaction between metal element and the non-metal element (both of which are main constituents of the ceramic member to be jointed by the brazing metals produced by the present method), brazing can not be performed, because chemical reactions do not occur between the metal elements of the metal layer and the ceramic member.

The metal layer constituting the brazing metals produced by the method of the present invention has preferably a thickness of $5 \times 10^{-4} - 0.1$ mm, but more preferably a thickness of $5 \times 10^{-4} - 1 \times 10^{-2}$ mm. If the thickness of the metal layer is less than $5 \times 10^{-4}$ mm, the amount of the metal element constituting the metal layer is so small that the reaction between the molten brazing metals and the ceramic member is weak, and jointed articles of weak joints strength can solely be attained. While, if the thickness of the metal layer is more than 0.1 mm, the amount of the metal element constituting the metal layer is so excessively large that the metal element is not perfectly dissolved and remains partially in a solid form in the melt of the metal substrate even when the metal substrate is melted, and the chemical reaction between the metal element and the ceramic member does not sufficiently occur.

The thickness ratio or the thickness to diameter ratio of the metal layer to the metal substrate constituting the brazing metals produced by the method of the present invention is preferably $5 \times 10^{-3} - 0.1$, but more preferably 0.01–0.1. If the ratio is less than $5 \times 10^{-3}$, the amount of the metal element constituting the metal layer is so small that the reaction between the molten brazing metals and the ceramic member is weak, and jointed articles of low joint strength can only be attained. If the ratio is above 0.1, the amount of the metal element constituting the metal layer is so excessively large that the metal element is not perfectly dissolved and remains partially in a solid form in the melt of the metal substrate even when the metal substrate is melted, and the chemical reaction between the metal element and the ceramic member does not sufficiently occur.

The metal substrate is made of a thin planar or strand shaped general metal, preferably commercial brazing metal, particularly a brazing metal selected from the group consisting of silver solders, copper solders, brass solders, gold solder, palladium solder and amorphous nickel solders.

The metal substrate can be produced by rolling, drawing, liquid quenching or like methods used for producing planar or strand shaped metals.

Selection of the metal substrate from the above metals depends on the kinds of the metallic members to be jointed or temperatures at which the jointed articles are to be used. For example, as a metal substrate of brazing metals for jointing articles in which the jointed parts are used at mild use conditions (a temperature not exceeding about 400° C.), silver solders, copper solders or brass solders can be used. As a metal substrate for brazing metals for jointing articles in which the jointed parts are used at conditions of temperature of exceeding about 400° C., gold solder, palladium solder, amorphous nickel solders or like high m.p. metal substrates are preferably used.

According to the method of producing the brazing metals of the present invention, on at least one surface of the metal substrate, a metal layer or layers consisting of the metal element or elements of having a m.p. higher than that of the metal substrate is applied. However, if the metal layer and the metal substrate are available for producing an alloy, they form an alloy and a melt of the alloy, even if the heating temperature at brazing or jointing is below the m.p. of the metal layer. More specifically, if the brazing metal according to the present invention is heated, the metal substrate melts first, and then the metal element constituting the metal layer is dissolved into the melt of the metal substrate to form a liquid brazing metal which is highly reactive with the ceramic member.

In contrast, if the m.p. of the metal layer is below the m.p. of the metal substrate, the metal layer melts before the metal substrate melts. Therefore, the metal element constituting the metal layer flows out from the jointed surfaces, and the reaction between the ceramic member and the metal element takes place before the alloy of the metal substrate and the metal element forms, therefore resulting in jointed articles of low strength at jointed portions. Thus, the metal layer consisting of a metal element of m.p. lower than that of the metal substrate is not preferable.

When plate shaped brazing metals are produced by the method of the present invention for jointing a metallic member and a ceramic member, the metal layer is provided on at least one surface of the plate shaped metal substrate. However, if the brazing metals according to the present invention is used for jointing ceramic members mutually, the metal layer is preferably provided on both surfaces of the metal substrate.

If the brazing metals according to the present invention are used for mutual jointing of different kinds of ceramic members, the kinds of metal elements constituting the metal layers which are to be provided on both surfaces of the metal substrate can be selectively varied, depending on the kind of the ceramic member to be jointed.

In the method of producing the brazing metals of the present invention, the metal layer consisting of a metal element which has m.p. higher than m.p. of the metal substrate, is applied on the surface of the metal substrate. In this case, if the metal layer is applied on the surface of the metal substrate after the substrate surface is roughened by a suitable means such as sandblasting or grinding, adhesion strength of the metal layer to the metal substrate is enhanced, so that peeling-off of the metal layer from the metal substrate is eliminated. Thus, workability or work efficiency is improved.

If the roughening is effected by means of a grinding paper, the grinding papers of No. 600 or less are preferable, and No. 600-240 are particularly preferable. The degree of the roughening or roughness is preferably a center line average height (Ra) of 0.1-2.0 $\mu$m, and particularly 0.3-0.6 $\mu$m. If the roughness Ra is below 0.1 $\mu$m, the adhesion strength of the metal layer to the metal substrate is weak, and peeling-off of the metal layer from the metal substrate occurs in handling of the brazing metal.

For applying the metal layer onto the metal substrate, any method of physical vapor deposition (PVD), chemical vapor deposition (CVD) and metal plating can be used. Among these methods, PVD is preferable because the thickness and area of the applied metal layer can be controlled and metal elements possessing no ductility can be applied on the substrate. Among the vapor deposition, vacuum deposition processess, sputtering or ion plating is particularly preferable.

Jointing of ceramic members mutually or jointing of a ceramic member and a metallic member to each other by the brazing metals of the present invention is effected as follows. Surfaces of the members to be jointed are superimposed with the brazing metals sandwiched therebetween, and heated in an inert gas, a reducing atmosphere or in a vacuo at a temperature above the m.p. of the brazing metals and below the m.p. of the ceramic member and the metallic member. In this case, the brazing metals are preferably disposed such that the surface of the metal layer covering the surface of the metal substrate contacts intimately with the surface of the ceramic member to be jointed. The heating to the brazing temperature can be effected by usual heating means. Cooling after the jointing is selected from cooling in a furnace or air cooling, depending on the shapes of jointed articles and the kinds of materials constituting the jointed articles.

Other objects and advantages of the present invention will be apparent from the ensuing descriptions and claims.

BRIEF DESCRIPTION OF THE DRAWINGS

For a better understanding of the present invention, reference is made to the accompanying drawings, in which:

FIG. 1 is an explanational view showing a cross-section of (brazing metals) produced by the present method;

FIG. 2 is an explanational view showing a cross-section of other brazing metals produced by the present method;

FIG. 3 is an explanational view illustrating a method of jointing a ceramic member and a metallic member, using the brazing metals obtained by the present method; and FIG. 4 is a cross-sectional view showing a structure of a specimen for measuring a strength of a joint of a metallic member and a ceramic member obtained by using (brazing metals) produced by the present method.

Throughout different views of the drawings, the reference numerals indicate the followings;

1 . . . metallic substrate, 2, 3 . . . metal layers, 4 . . . ceramic member, 5 . . . metal plating, 6 . . . metallic member, 7 . . . ceramic disc, 8 . . . jointed metals.

DETAILED DESCRIPTION OF THE PREFERRED EMBODIMENTS

Hereinafter, the present invention will be explained in more detail with reference to the attached drawings.

EXAMPLE 1

Referring to FIG. 1, which shows a schematic view of a cross-section of the brazing metals 10 produced by the present method, in which a surface of a plate shaped metal substrate 1 is coated with a metal layer 2. An illustrative example of producing the brazing metal 10 is as follows. A plate or substrate 1 of a silver solder of a thickness of 0.1 mm is produced from an ingot by rolling and is roughened at a surface by a grinding paper of No. 400, and then purified. Thereafter, the silver solder plate 1 is positioned in a sputtering device in such a fashion that the roughened surface thereof opposes a target made of titanium metal. Sputtering is effected to apply a titanium metal layer of a thickness of 0.5-10 $\mu$m on the brazing silver plate to obtain brazing metals comprising of the metal substrate 1 of silver solder and the metal layer 2 of titanium. In this method, the metal constituting the target is applied or adhered on the metal substrate, so that the metal to be applied can be changed simply by changing the kind of target metal. The target can be composed of one or more metals or alloys thereof. The amount of the metal to be applied on the substrate is adjusted by controlling the sputtering time.

EXAMPLE 2

Referring to FIG. 2, which shows a schematic view of a cross-section of the brazing metals 20 produced by the present method, in which both surfaces of a plate shaped metal substrate 1 are coated with metal layers 2 and 3 which may be the same or different kinds of metal. The metal to be applied is selected depending on the of ceramic member which is jointed to be. An illustrative example of producing the brazing metals 20 is as follows. A metal substrate or plate of a brazing metal produced by rolling is roughened at both surfaces thereof by sandblasting, and then the surfaces are purified. Thereafter, one surface of the metal substrate is coated with the metal layer 2 in a sputtering device. Then the metal substrate is taken out of the sputtering device and the other surface of the metal substrate is coated with metal layer 3 by the sputtering process, a physical vapor deposition process, a chemical vapor deposition process or a metal plating process. If the metal layers 2 and 3 are of the same kind of metal, the metal layers 2 and 3 may be applied on the substrate surfaces simultaneously.

EXAMPLE 3

Referring to FIG. 3 which shows a schematic view in cross-section illustrating a method of jointing a ceramic member 4 and a metallic member 6 by using the brazing metals 10 produced by the present method. The jointing is effected, for example, by the following method. The ceramic member 4 and the metallic member 6 are prepared and their surfaces to be jointed are purified. If necessary, the surface of the metallic member 6 scheduled for jointing is coated with a metal plating 5. The brazing metals 10 produced by the present method are disposed and sandwiched between the surfaces of members 4, 6 scheduled for jointing. The members 4, 6 are aligned in their jointing positions, fixed firmly by a suitable fixing means, and heated in a furnace in vacuo at a temperature above the m.p. of the metal substrate constituting the brazing metals 10 and below the melting points of the metallic member 6 and the ceramic member 4, to melt the brazing metals 10. After holding at the temperature for an appropriate time, the furnace temperature is lowered below the m.p. of the brazing metals to solidify the same, thereby to complete the jointing.

The holding time at the heating temperature is a requisite time (usually 1–10 min, optionally beyond this range) for alloying the metal substrate 1 and the coated metal layer 2 and for reacting the brazing metals 10 with the ceramic member 4 and the metallic member 6.

EXAMPLE 4

Plate shaped metal substrates as described in the following Table 1 are roughened at their one side surfaces by a No. 400 grinding paper, and purified with acetone and alcohol at the roughened surfaces. Layers of metal elements and thicknesses described in the following Table 1 are applied on the roughened substrates surfaces by sputtering, to produce brazing metals 10 composed of the metal substrate and the metal layers in combinations as described in Table 1, and of the structure as shown in FIG. 1.

In reference to Table 1, the brazing metals are used to joint metal rods on both surfaces of ceramic discs to produce metal-ceramic jointed articles (specimen Nos. 1–13) of a shape as shown in FIG. 4, wherein metal rods 8 correspond to the metallic members which are jointed integrally on both surfaces of ceramic disc 7. The ceramic discs have a diameter of 11 mm and a height of 10 mm and are made of the material listed in Table 1. The metal-ceramic jointed articles were joined at temperatures described in Table 1 and have a total length of 100 mm.

The jointed articles are finished or ground by machining at their outer peripheries to a diameter of 10 mm, and then measured on their joints strength by a tensile test. The results are shown in Table 1.

For comparison, referential specimen Nos. 101–102 were produced using a metallic member of Kovar and a ceramic member of silicon nitride, which are beyond the numeral limitations of the present invention, and a referential specimen No. 103 was produced using a metallic member of Kovar and a ceramic member of alumina, which combination is also beyond the combinations of the present invention as described in Table 1. The strengths of specimen Nos. 101–103 were measured in terms of tensile strength and the results are also shown in Table 1.

TABLE 1

| | Brazing Metals | | | | Ratio of metal layer to metal substrate | | | Structure of joint articles | | Diameter (mm) | Brazing temperature (°C.) | Joint strength (kg/mm$^2$) |
|---|---|---|---|---|---|---|---|---|---|---|---|---|
| | Metal substrate | | Metal layer | | | | | | | | | |
| Specimen No. | Name | Thickness (μm) | Name | Thickness (μm) | Weight ratio (wt %) | Atomic ratio (at %) | Thickness ratio | Ceramic disc | Metal rod | | | |
| 1 | 72Ag—28Cu | 100 | Ti | 0.7 | 0.3 | 0.6 | 0.007 | silicon nitride | Kovar | 10 | 850 | 4 |
| 2 | 72Ag—28Cu | 100 | Ti | 1.7 | 0.7 | 1.3 | 0.017 | silicon nitride | Kovar | 10 | 850 | 18 |
| 3 | 72Ag—28Cu | 100 | Ti | 2.3 | 1.0 | 2.0 | 0.023 | silicon nitride | Kovar | 10 | 850 | 16 |
| 4 | 72Ag—28Cu | 100 | Ti | 3.2 | 1.4 | 2.6 | 0.032 | silicon nitride | Kovar | 10 | 850 | 17 |
| 5 | 72Ag—28Cu | 100 | Ti | 6.4 | 2.8 | 5.3 | 0.064 | silicon nitride | Kovar | 10 | 850 | 6 |
| 6 | 72Ag—28Cu | 100 | Ti | 1.7 | 0.7 | 1.3 | 0.017 | silicon nitride | Mo | 10 | 850 | 23 |
| 7 | 72Ag—28Cu | 100 | Ti | 1.7 | 0.7 | 1.3 | 0.017 | silicon nitride | Fe—42Ni | 10 | 850 | 13 |
| 8 | 72Ag—28Cu | 100 | Zr | 2.0 | 1.3 | 1.3 | 0.020 | silicon nitride | Kovar | 10 | 850 | 15 |
| 9 | 72Ag—28Cu | 100 | Hf | 2.0 | 2.6 | 1.5 | 0.020 | silicon nitride | Kovar | 10 | 850 | 10 |
| 10 | 72Ag—28Cu | 100 | Ti | 1.7 | 0.7 | 1.3 | 0.017 | alumina | Kovar | 10 | 850 | 10 |
| 11 | Ni | 100 | Ti | 2.0 | 1.0 | 1.2 | 0.020 | alumina | Kovar | 10 | 1,300 | 7 |
| 12 | Ni | 100 | Ti | 8.5 | 4.4 | 5.4 | 0.085 | silicon carbide | Kovar | 10 | 1,300 | 7 |
| 13 | Cu | 100 | Ti | 2.0 | 1.0 | 1.3 | 0.002 | silicon carbide | Kovar | 10 | 1,100 | 12 |
| 101 | 72Ag—28Cu | 100 | Ti | 0.2 | 0.1 | 0.2 | 0.002 | silicon nitride | Kovar | 10 | 850 | —* |
| 102 | 72Ag—28Cu | 100 | Ti | 13 | 5.4 | 10.2 | 0.13 | silicon nitride | Kovar | 10 | 850 | —* |
| 103 | 72Ag—28Cu | 100 | Hf | 2.0 | 2.6 | 1.3 | 0.020 | alumina | Kovar | 10 | 850 | —** |

Note
*Silicon nitride and the metal rod could not be jointed.
**Alumina and the metal rod could not be jointed.

As seen from Table 1, the specimen Nos. 1–13 jointed by using the brazing metals of the present invention exhibit high joint strengths, while the referential specimen Nos. 101–102 using metal and ceramic members beyond the numeral limitations of the present invention, could not produce joints between the ceramic member and the metallic member, namely, between a ceramic disc made of silicon nitride and a metal rod made of Kovar. The referential specimen No. 103 using brazing metals of a combination of metal and ceramic members, which metal is beyond the scope of the present invention, also could not produce joints between the ceramic member and the metallic member, because a reaction could not occur between the ceramic member and the brazing metals.

As explained in detail in the foregoing, the method of producing the brazing metals of the present invention applies a thin metal layer of a specific active metal element on a surface of a metal substrate having ductility, so that ductility of the brazing metals is not damaged, even if the metal constituting the metal layer is a metal element of poor ductility. Thus, the active metal element constituting the metal layer can be selected by paying attention to solely the reactivity thereof with the ceramic member. This is the reason why the brazing metals produced by the present method provide easy handling and high joint strength.

In the method of producing the brazing metals according to the present invention, an active metal element highly reactive with the ceramic member is applied on the surface of the metal substrate by a PVD process, a CVD process or a metal plating process, etc., so that the amount of the active metal to be applied can be adjusted easily. Accordingly, the present method can easily produce the brazing metals having a low content of active metal element.

Therefore, if the brazing metals produced by the present method are used, formation of a brittle alloy layer in the joint can be prevented, so that metal-ceramic jointed articles and ceramic-ceramic jointed articles of high joint strengths can be obtained.

Metal-ceramic jointed articles and ceramic-ceramic jointed articles jointed by using the brazing metals produced by the present method, have characteristic properties similar to ceramics of heat resistive, wear resistant, high strength, anticorrosive and low density. Therefore, they can be used as parts of turbines or parts of internal combustion engines, such as pistons, tappets, intake valves, exhaust valves, turbochargers, locker arms, cams and other parts which repeatedly receive high temperatures, loads or impact loads.

Though the present invention has been described with specific examples, it is apparent to those skilled in the art that various changes and modifications thereof are possible without departing from the broad spirit and aspect of the present invention hereinafter claimed.

What is claimed is:

1. A method of producing brazing metals having a layered structure for joining ceramic members mutually or a ceramic member and a metallic member to each other comprising:
    adjusting at least one surface of a metal substrate to a surface roughness of center line average height of Ra of 0.5–2.0 microns; and
    applying at least one active metal layer, which has a melting point higher than that of the metal substrate, on said at least one surface of said metal substrate by a process selected from the group consisting of physical vapor deposition, chemical vapor deposition, and metal plating, to a thickness of $5 \times 10^{-4}$–0.1 mm, such that a thickness ratio or a thickness to diameter ratio of the active metal layer to the metal substrate is in a range of $1 \times 10^{-2}$ – $1 \times 10^{-1}$ and a weight ratio of the active layer to the metal substrate is in a range of 0.7–4.4%.

2. A method according to claim 1, wherein the metal substrate is a plate or wire produced by at least one method selected from the group consisting of rolling, drawing and liquid quenching.

3. A method according to claim 1, wherein the ceramic member to be joined is at least one ceramic selected from the group consisting of silicon nitride, silicon carbide and sialon, and the active metal layer is at least one metal element selected from the group consisting of Zr, Ti, B, Ta, Hf, V, Cr, La, Sc, Y and Mo.

4. A method according to claim 1, wherein the ceramic member to be joined is at least one ceramic selected from the group consisting of zirconium, alumina, mullite, aluminum titanate and cordierite, and the active metal layer is at least one metal element selected from the group consisting of Be, Ce, Zr and Ti.

5. A method according to claim 1, wherein the metal substrate has a plate-shape and the active metal layer is applied on only one surface thereof.

6. A method according to claim 1, wherein the physical vapor deposition process is selected from the group consisting of vacuum deposition, sputtering and ion plating.

7. A method of producing brazing metals having a layered structure for joining ceramic members mutually or a ceramic member and a metallic member to each other comprising:
    adjusting at least one surface of a metal substrate to a surface roughness of center line average height of Ra of 0.5–2.0 microns; and
    applying at least one active metal layer, which has a melting point higher than that of the metal substrate, on said at least one surface of said metal substrate by a process selected from the group consisting of physical vapor deposition, chemical vapor deposition, and metal plating, to a thickness of $5 \times 10^{-4}$–0.1 mm, such that a thickness ratio or a thickness to diameter ratio of the active metal layer to the metal substrate is in a range of $1 \times 10^{-2}$ – $1 \times 10^{-1}$ and an atomic ratio of the active metal layer to the metal substrate is in a range of 1.2–5.4%.

8. A method according to claim 7, wherein the metal substrate is a plate or wire produced by at least one method selected from the group consisting of rolling, drawing and liquid quenching.

9. A method according to claim 7, wherein the ceramic member to be joined is at least one ceramic selected from the group consisting silicon nitride, silicon carbide and sialon, and the active metal layer is at least one metal element selected from the group consisting of Zr, Ti, B, Ta, Hf, V, Cr, La, Sc, Y and Mo.

10. A method according to claim 7, wherein the ceramic member to be joined is at least one ceramic selected from the group consisting of zirconium, alumina, mullite, aluminum titanate and cordierite, and the active metal layer is at least one metal element selected from the group consisting of Be, Ce, Zr and Ti.

11. A method according to claim 7, wherein the metal substrate has a plate-shape and the active metal layer is applied on only one surface thereof.

12. A method according to claim 7, wherein the physical vapor deposition process is selected from the group consisting of vacuum deposition, sputtering and ion plating.

* * * * *